(12) United States Patent
Baenziger et al.

(10) Patent No.: US 6,446,895 B1
(45) Date of Patent: Sep. 10, 2002

(54) LEVEL WIND MECHANISM

(76) Inventors: Robert C. Baenziger, 1001 S. Mudspring Rd., Payson, AZ (US) 85541; Casey J. Childre, 19922 Brinks Willis Rd., Foley, AL (US) 36535

( * ) Notice: Subject to any disclaimer, the term of this patent is extended or adjusted under 35 U.S.C. 154(b) by 0 days.

(21) Appl. No.: 09/843,464

(22) Filed: Apr. 26, 2001

(51) Int. Cl.[7] ............................................. A01K 89/01
(52) U.S. Cl. ..................................................... 242/277
(58) Field of Search .................................. 242/277, 278

(56) References Cited

U.S. PATENT DOCUMENTS

| | | | |
|---|---|---|---|
| 1,438,007 A | * 12/1922 | Welch | 242/277 |
| 1,456,283 A | 5/1923 | Schmmid | |
| 1,507,404 A | * 9/1924 | Welch | 242/277 |
| 1,619,448 A | 3/1927 | Vance | |
| 1,774,789 A | 9/1930 | Dina | |
| 1,898,316 A | 2/1933 | Schafer | |
| 1,964,965 A | 7/1934 | Smelser | |
| 2,198,231 A | 4/1940 | Schafer | |
| 2,204,125 A | 6/1940 | Dayton | |
| 2,520,552 A | 8/1950 | Kilian | |
| 2,609,161 A | * 9/1952 | Guhlin et al. | 242/277 |
| 2,613,044 A | 10/1952 | Zetts | |
| 3,111,287 A | 11/1963 | Baenziger | |
| 3,171,609 A | 3/1965 | Baenziger | |
| 3,612,425 A | 10/1971 | Shakespeare et al. | |
| 3,670,985 A | 6/1972 | Morishita | |
| 3,993,264 A | 11/1976 | Kamikawa | |
| 4,285,476 A | 8/1981 | Baenziger | |
| 4,341,366 A | 7/1982 | Kawada | |
| 4,361,293 A | 11/1982 | Baenziger | |
| 4,402,470 A | 9/1983 | Hamayasu | |
| 4,557,429 A | 12/1985 | Atobe | |
| 4,580,741 A | 4/1986 | Murakami et al. | |
| 4,666,101 A | 5/1987 | Atobe | |
| 4,772,410 A | 9/1988 | Sato | |
| 4,807,827 A | 2/1989 | Welch | |
| 5,388,776 A | 2/1995 | Childre | |

* cited by examiner

*Primary Examiner*—Emmanuel M. Marcelo
(74) *Attorney, Agent, or Firm*—Cook, Alex, McFarron, Manzo, Cummings & Merhler, Ltd.

(57) ABSTRACT

A fishing reel with side walls and a level wind, with a spool shaft rotatably supported therebetween. The spool shaft supports the spool that holds the fishing line. A handle shaft is provided that includes a driving gear that engages a pinion on the spool shaft for winding in the fishing line upon the spool. The level wind comprises a generally transverse shaft rotatably secured between the side walls in front of the spool. The transverse shaft is adapted to be rotated by the driving gear, and is formed with a central portion that is at an oblique angle with respect to the shaft. The obliquely-oriented portion of the shaft is rotatably captured by a member having an eyelet associated therewith through which the fishing line is threaded.

27 Claims, 6 Drawing Sheets

LEVEL WIND MECHANISM

BACKGROUND OF THE INVENTION

The present invention relates to a bait casting fishing reel and, more particularly, to an improved level wind mechanism forming a part of a bait casting reel.

The bait casting fishing reel has become the reel of choice among skilled fisherman, particularly when used for bass fishing. Because of the habitat favored by bass, accurate casting is required to avoid having the line or bait become tangled in various obstacles, such as logs, branches and water plants. Skilled anglers find that they can more accurately cast with a bait casting reel than with a spinning or spin casting reel.

In seeking to improve bait casting fishing reels, attempts are being made to reduce their weight. Nearly full advantage has been made of new, lighter-weight materials in constructing the reel. Thus, it now seems that the most significant weight reductions may be the result of reducing the size of the reel. However, decreasing the size of the reel also may result in decreasing the line capacity, which is undesirable.

Also, for a given size spool of line, the size of the reel and, more specifically, the width of the reel, has been governed by the space required for the level wind mechanism. The level wind is typically located in front of the reel and helps insure that the fishing line is evenly wound upon the spool as it is reeled in.

The general design of the level wind mechanism has remained unchanged for over 100 years and is typified by that illustrated in FIG. 1. (See also, e.g., U.S. Pat. No. 2,204,125 to Dayton). The level wind mechanism 1 employs a screw or shaft 2 mounted between the reel side plates 3 for rotation in parallel alignment with the spool 4. The shaft 2 comprises a worm gear that has a continuous thread 5 cut in both directions so that the thread 5 crosses back on itself several times along the axis of the shaft. The shaft 2 includes a sleeve, block or equivalent structure 6 slidingly mounted thereon that includes a pawl or claw (not shown) that engages the thread 5 so that, as the shaft 2 is rotated by means of the handle 7, the sleeve traverses back and forth in front of the full width of the spool 4. The sleeve also supports a line guide 8 through which the fishing line is threaded. Accordingly, the line guide 8 moves back and forth in front of the spool as the line is wound in, in order to evenly distribute the line on the spool.

The level wind is generally a complicated mechanism requiring several small parts and precise machining. It is also one of the more expensive components of the reel assembly and requires major disassembly to repair. The level wind mechanism is also sufficiently complex to make it virtually impossible to repair in the field.

It should be noted that in order to have the line guide 8 travel the full width of the spool, the worm gear and pawl arrangement require a spacing between the side plates that is wider then the spool. Further, as can be appreciated, excessive wear is caused to the worm gear and/or pawl where the thread crosses itself.

Accordingly, it is the principal object of the present invention to provide for a lighter weight bait casting reel that has more line capacity than comparably-sized, presently available reels.

More specifically, it is an object of the present invention to provide a level wind mechanism that permits the width of the spool to be increased without increasing the overall width of the reel.

It is a further object to provide a level wind mechanism that is simpler to manufacture, longer wearing, and is easy to install.

SUMMARY OF THE INVENTION

These objects, as well as others which will become apparent upon reference to the accompanying drawings and following description, are provided by a fishing reel with side walls with a spool shaft rotatably supported therebetween. The spool shaft supports the spool that holds the fishing line. A handle shaft is provided that includes a driving gear that engages a pinion on the spool shaft for winding in the fishing line upon the spool. A level wind having a generally transverse shaft is rotatably secured between the side walls in front of the spool. The transverse shaft is adapted to be rotated by the driving gear, and is formed at a central portion to provide two spaced-apart, generally parallel faces disposed at an oblique angle with respect to the shaft. The obliquely-oriented portion of the shaft is rotatably captured by a member having an eyelet associated therewith through which the fishing line is threaded. The member and its associated eyelet oscillate back and forth in front of the spool upon rotation of the transverse member by the driving gear, so that when the fishing line is reeled in, it is wound evenly along the length of the spool. In one embodiment, the obliquely-oriented faces are provided by forming the central portion of the shaft with a slot, and a portion of the transverse shaft between the two parallel faces of the slot is substantially perpendicular to the faces. In another embodiment, the obliquely oriented faces are the opposite faces of a disk-like member supported on the central portion of the transverse shaft. The level wind may also be driven by means of a slotted star wheel (i.e., a "Geneva motion" mechanism) in order to have the line either cross wound or helically wound upon the spool. In the case of cross winding, it is possible to make the line "jerk" as each slot of the star wheel is engaged, thus producing a jigging motion to the lure or bait as the line is reeled in.

BRIEF DESCRIPTION OF THE DRAWINGS

The invention is illustrated diagrammatically in the following drawings wherein.

DETAILED DESCRIPTION OF THE PREFERRED EMBODIMENT

Figure 1:
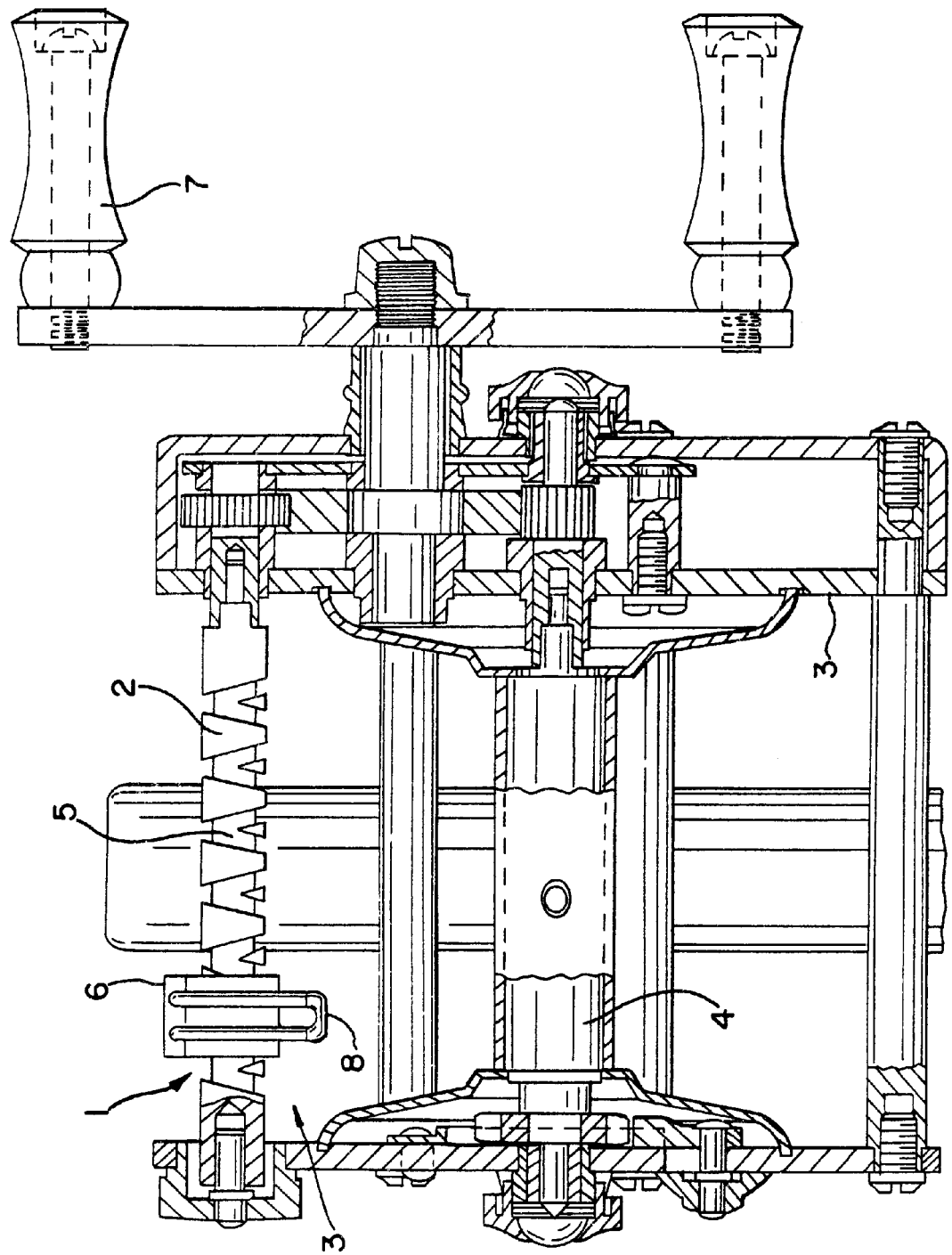
FIG. 1 is a plan view of a typical prior art bait casting reel employing a level wind mechanism of the type that has been in use for the past 100 years.
Figure 2:
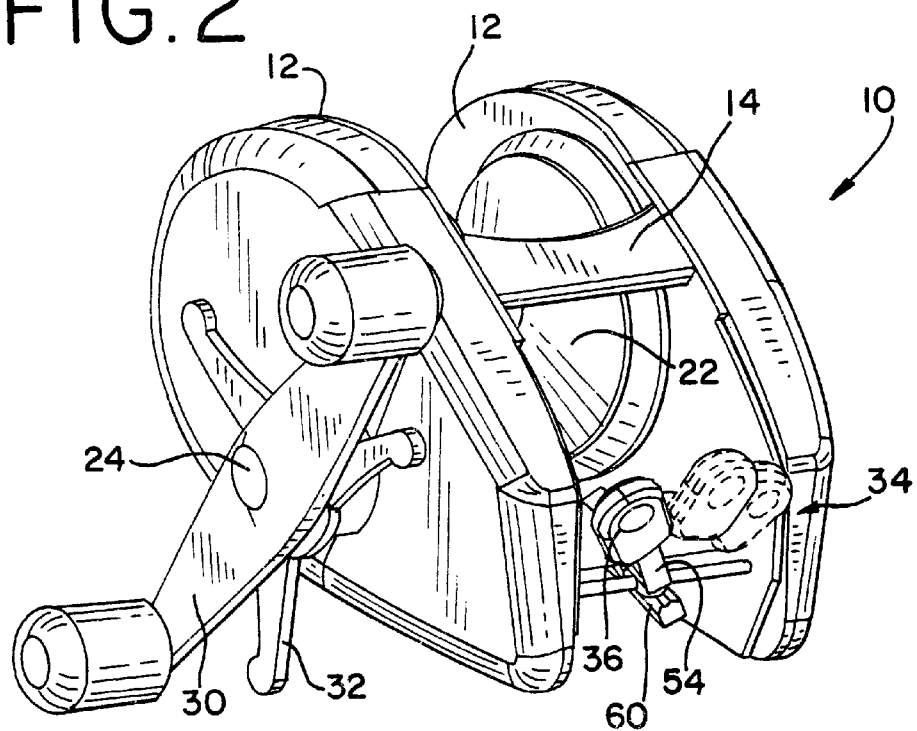
FIG. 2 is a perspective view of a bait casting fishing reel incorporating a level wind mechanism according to the present invention.
Figure 3:
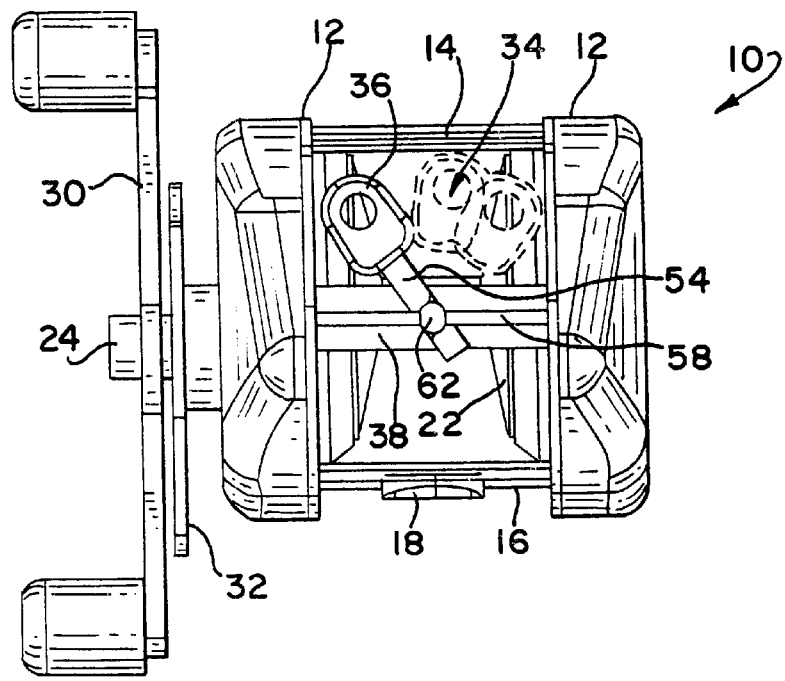
FIG. 3 is a plan view of the fishing reel of FIG. 2.
Figure 4:
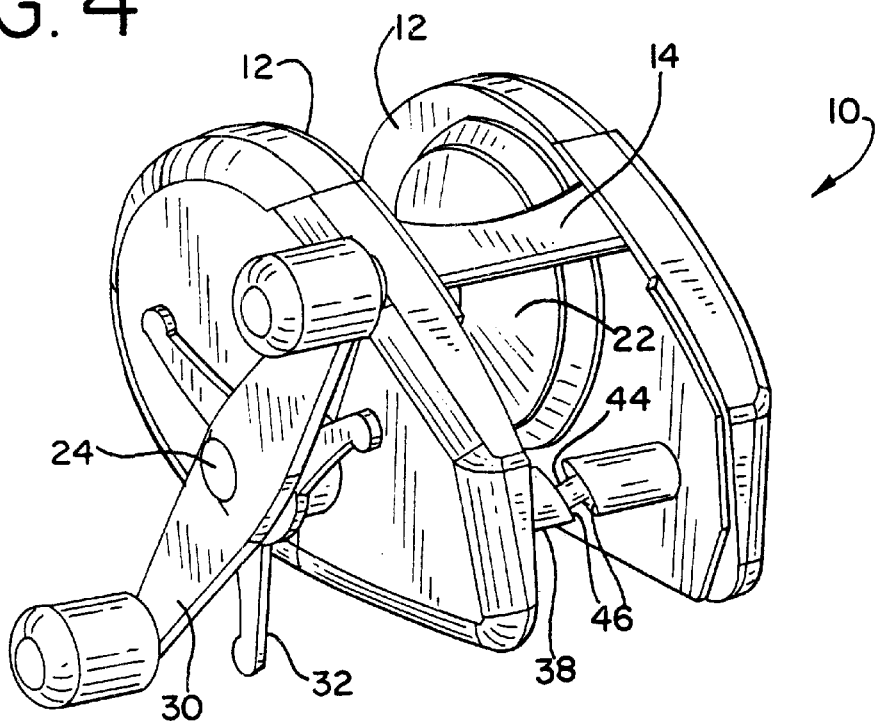
FIG. 4 is a perspective view of the fishing reel similar to FIG. 2, except that certain parts are removed to show detail.
Figure 5:
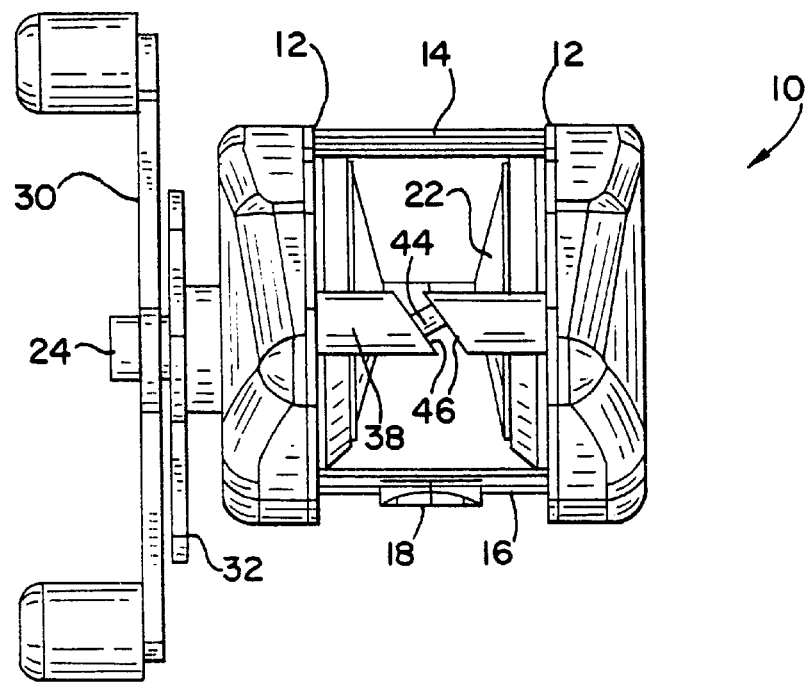
FIG. 5 is a front plan view of the fishing reel of FIG. 4.

Turning to FIGS. 2–5, there is seen a bait casting fishing reel, generally designated 10, according to the present invention. As is well known, the reel 10 includes two opposed side walls 12 joined together in spaced relationship by cross-members 14, 16. One of the cross-members 16 supports a foot or rod mount 18 to facilitate securing the reel 10 to a fishing rod (not shown).

Figure 8:
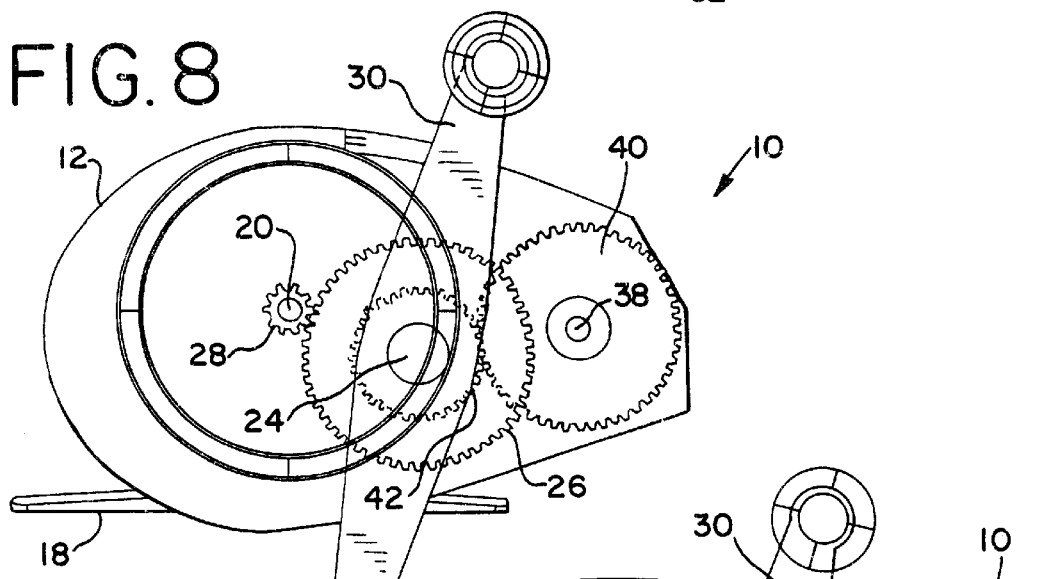
FIG. 8 is a side view of a fishing reel according to the present invention showing a conventional drive mechanism for the level wind.

A spool shaft 20 (best seen in FIG. 8 or 9) is rotatably supported between the side walls 12, to which a spool 22 is secured for holding fishing line. To rotate the spool 22 to wind in the fishing line, the reel 10 includes a handle shaft 24 (best seen in FIG. 8 or 9) that includes a driving gear 26 that selectively engages a pinion 28 mounted on the spool shaft 20. A crank handle 30 is secured to the handle shaft 24 to facilitate the rotating of the handle shaft by the fisherman. A drag adjustment 32 may also be provided.

In keeping with the invention, a novel level wind mechanism 34 is provided for winding the fishing line evenly upon the spool 20 as the line is reel in. As is typical, the level wind 34 includes an eyelet or line guide 36 through which the fishing line is threaded. The line guide 36 moves back and forth in front of the spool to lay the fishing line evenly along the full width of the spool 22.

Figure 6:
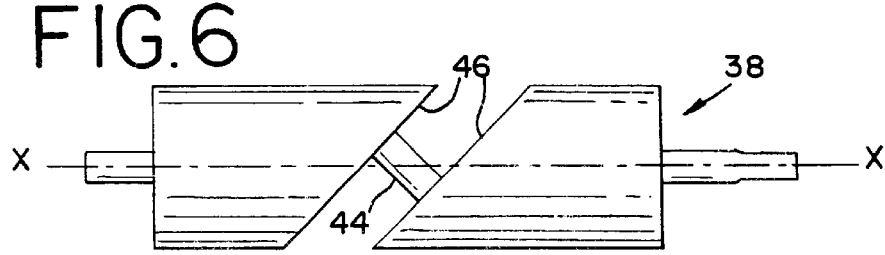
FIG. 6 is a plan view of the rotatable shaft portion for a level wind mechanism according to the present invention.

To this end, the level wind 34 includes a generally transverse shaft 38 rotatably supported between the side walls 12 in front of the spool 22. The shaft 38 includes a gear 40 that is engaged by a gear 42 on the handle shaft 24 so that the shaft 38 may be rotated about its longitudinal axis X—X (FIG. 6 or 7) upon rotation of the crank handle 30, which simultaneously rotates the spool shaft 20/spool 22 in a direction to reel in the fishing line.

Figure 7:
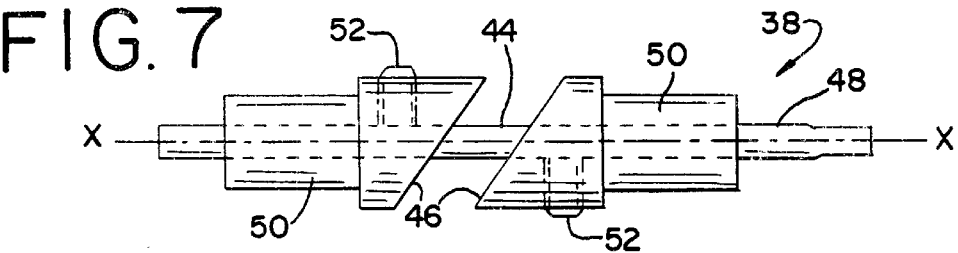
FIG. 7 is a plan view of an alternative embodiment for a rotatable shaft portion for the level wind mechanism according to the present invention.

The shaft 38 is relieved at a central portion 44 to provide two substantially parallel faces 46 that are disposed at an oblique angle with respect to the longitudinal axis X—X of the shaft 38. The central portion 44 of the shaft 38 is preferably dispose perpendicularly to the parallel faces 46 (as in FIGS. 4–6), or may be coincident with the longitudinal axis X—X of the shaft 38 (as in FIG. 7). The shaft 38 may be made of metal or plastic employing any of a number of different, well-known techniques, such as die casting, injection molding, or machining. With reference to FIG. 7, the shaft is made of three parts: an elongated spindle 48 and two sleeve members 50 that carry the parallel faces 46, each sleeve member 50 being secured to the spindle 46 by a set screw 52.

The line guide 36 is mounted on a plate-like member (or line guide block) 54 that captures the relieved portion 44 of the shaft 38 between the two obliquely-oriented parallel faces 46 so as to permit rotation of the shaft 38. As the shaft 38 rotates, the obliquely-oriented faces 46 engage the plate 54 to oscillate it (and, consequently, the line guide 36) back and forth in front of the spool 22 (see the positions of the line guide 36 shown in dotted lines in FIGS. 2 and 3).

As can be appreciated, the line guide 36 must traverse the full width of the spool 22 so that the fishing line is wound upon the entire width of the spool 22. Whether this is achieved is a function of (a) the angle between the parallel faces 46 and the longitudinal axis X—X of the shaft and (b) the length of the plate member 54 as measured by the distance between the line guide 36 and the shaft 38. Specifically, the smaller the angle between the parallel faces and the shaft (i.e., the closer the angle is to being perpendicular to the shaft) the longer plate member 54 must be. As illustrated, the angle between the parallel faces 46 and the axis of the shaft is approximately 40°, thus causing the plate oscillate through an arc of approximately 100° to move the line guide 36 back and forth in front of the spool.

Figure 10:
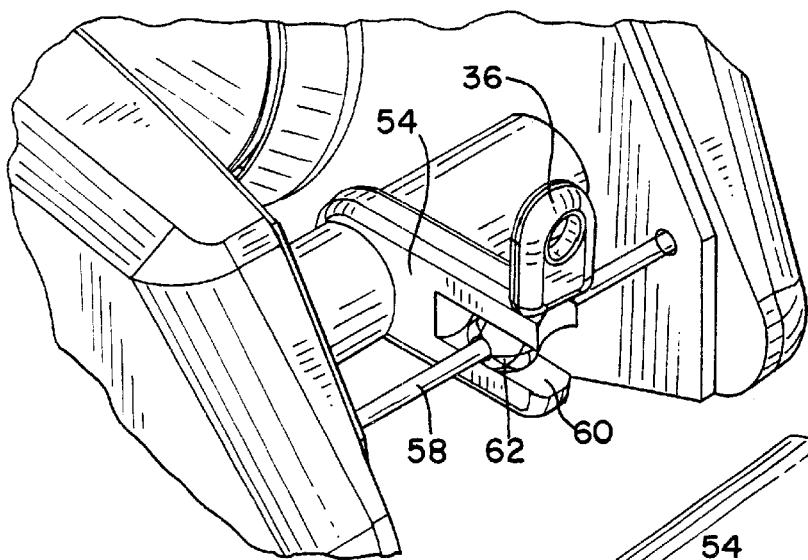
FIGS. 10–12 are enlarged fragmentary perspective views of three different embodiments for a level wind according to the present invention.
Figure 11:
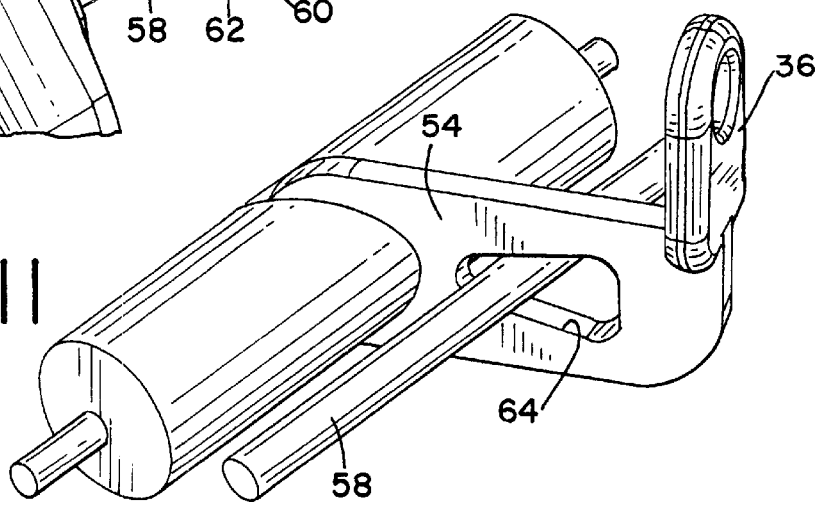
Figure 12:
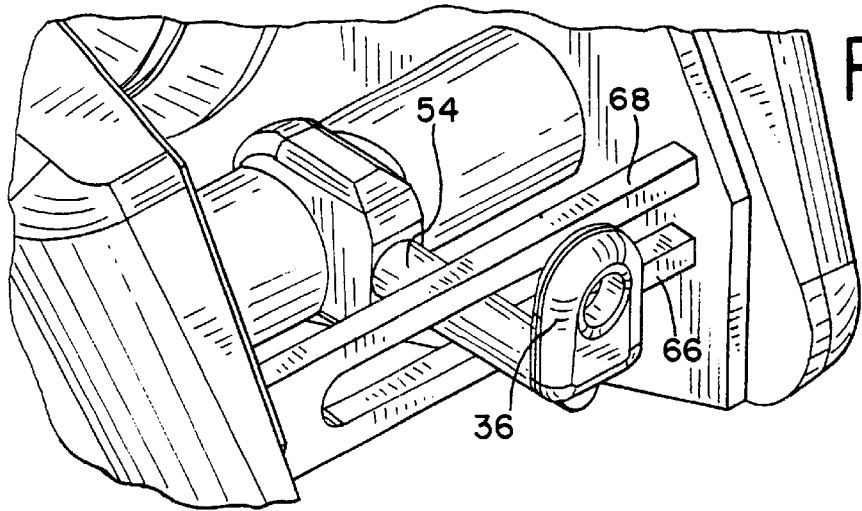
Figure 13:
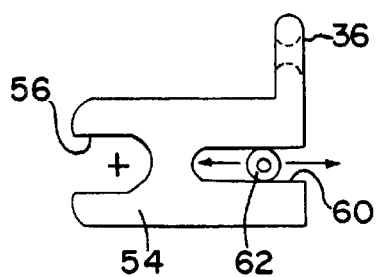
FIG. 13 is a plan view of the eyelet-carrying member of FIGS. 2, 3 and 10.

With reference to FIGS. 10–12, three different embodiments of the plate-like member 54 and its associated line guide 36 are shown in greater detail. In each of FIGS. 10–12, the line guide block 54 is sized in width to substantially fill the space between the parallel faces 46 defining the relieved portion 44 of the shaft 38. The line guide block 54 is also configured with an open-ended slot 56 (best seen in FIG. 13) that is sized to fit over the relieved portion 44 of the shaft 38, so as to permit easy rotation of the relieved portion 44 within the slot 56.

It has been found that the level wind 34 functions better if the forward portion of the line guide block 54 is also supported. To this end, the reel 10 includes an additional cross member 58 supported between the walls 12. This cross member 58 is captured in an elongated, open-ended slot 60 in the forward portion of the line guide block 54 so that the cross member is located generally underneath the line guide or eyelet 36. With reference to FIGS. 2, 3, 10 and 16, the top and bottom of the slot 60 are formed with a concave relief so as to form an elongated track for a spherical bearing 62 that has a through-bore sized to receive the cross member 58. Thus, as the line guide block 54 oscillates back and forth, the spherical bearing 62 simultaneously slides forward and back in the slot 60 in the line guide block 54 and back and forth along the cross number 58.

Alternatively, the line guide block 54, can be formed with an aperture 64 (FIG. 11) through which the cross-member 58 is received. In a further alternative, the line guide block 54 can be captured between parallel rails 66, 68 (FIG. 12), which are substituted for the cross member 58.

With the transverse shaft 38 as described above, a single revolution of the transverse shaft 38 results in the line guide 36 traveling completely across the front of the spool twice. As is well known, the relationship between the number of revolutions of the spool 22 for each back and forth movement of the level wind 34 is governed by the gear ratio between the gears 26 and 28 (for the spool 22) and the gears 42 and 40 (for the level wind 34), with both gears 26 and 42 being rotated by the handle shaft 24/crank handle 30. By adjusting these ratios, one can have the fishing wound helically upon the spool, with each winding being adjacent to the previous winding, or cross-wound, with each layer of windings being laid at an angle over the underlying layer of windings.

Figure 14:
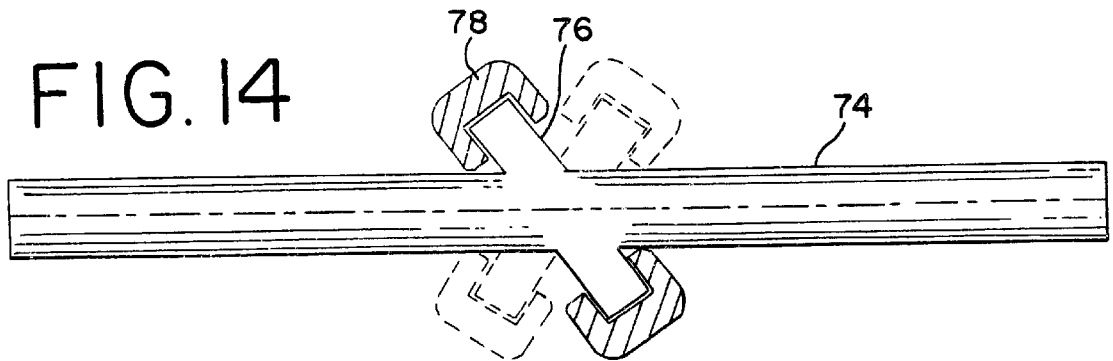
FIG. 14 is a plan view of a further alternate configuration of the rotatable shaft for a level wind mechanism according to the present invention.
Figure 15:
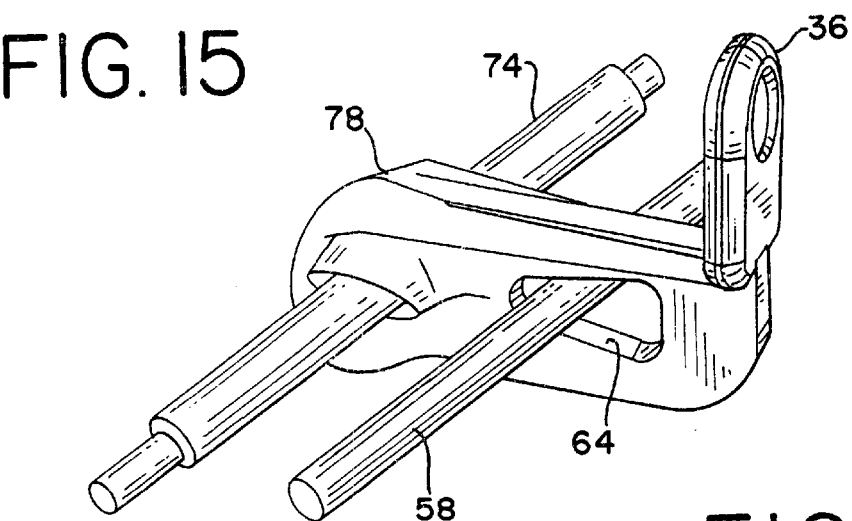
FIGS. 15 and 16 are fragmentary perspective views of two different level wind mechanisms utilizing the rotatable shaft of FIG. 14.
Figure 16:
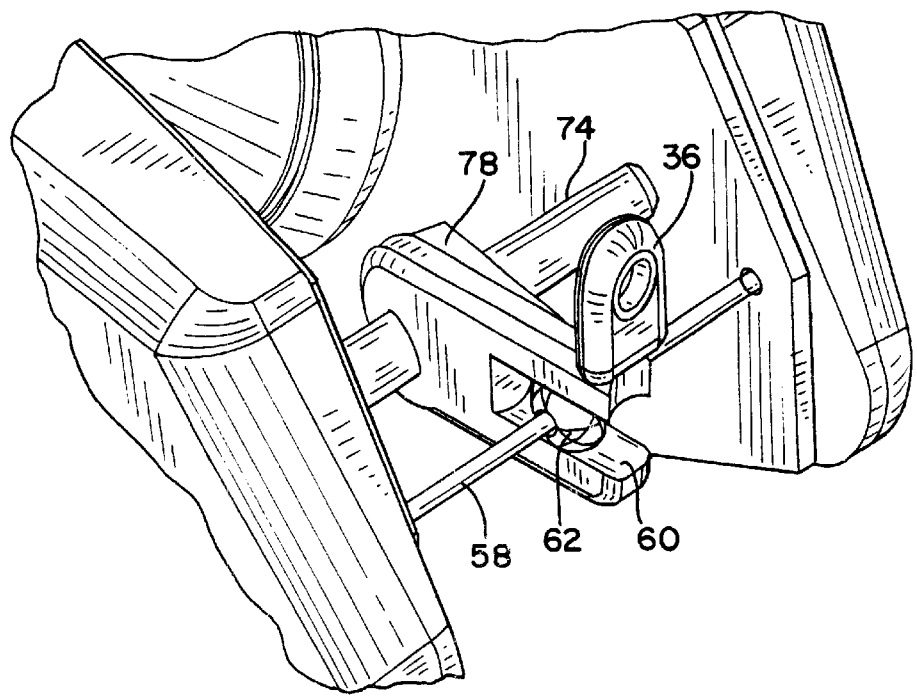

With reference to FIGS. 14–16, an alternate embodiment for the transverse shaft and line guide block are shown. In contrast to the previously-described embodiment in which the shaft is, in essence, relieved to form parallel, obliquely-oriented guide faces for the plate forming the line guide block, the shaft 74 is generally in the form of a spindle that has an obliquely-oriented disk-like member 76 centrally located thereon. The disk 76 is captured in a slot (not shown) in the rear portion of the line guide block 78. In other aspects, including its operation, the mechanism is the same as disclosed above, and identical reference numerals are used for the corresponding part shown in FIGS. 14–16.

Figure 9:
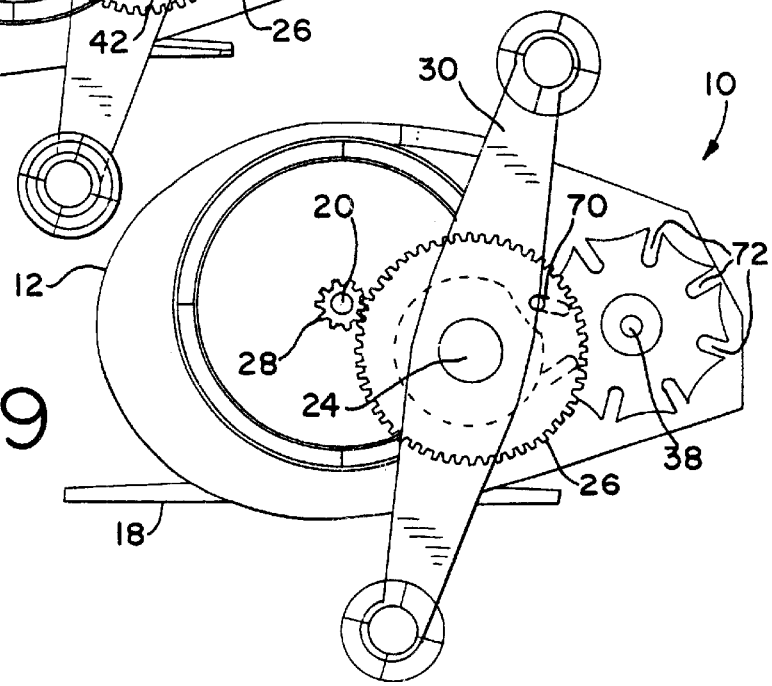
FIG. 9 is side view of a fishing reel according to the present invention showing a "Geneva motion" drive mechanism for the level wind.

A preferred mechanism for cross winding is shown in FIG. 9, in which the reel 10 utilizes a "Geneva motion" mechanism between the handle shaft 24 and the transverse shaft 38 of the level wind 34. A Geneva motion mechanism converts continuous rotary motion into intermittent rotary motion. With reference to FIG. 9, the drive gear 42 includes a single drive pin 70 that is received in the slots 72 (8 shown) formed in the driven gear 40, which is in the form a star wheel. The drive pin 70 cooperates with the slot 72 to cause an intermittent rotation of the star wheel 40, and, consequently, intermittent movement of the line guide 36 across the front of the spool 22. The intermittent movement of the line guide 36 serves to jig the bait being reeled in.

While the invention has been described in terms of certain preferred embodiments, there is no intention to limit the invention to the same. Instead, the invention is to be defined by the appended claims.

The embodiments of the invention in which an exclusive property or privilege is claimed are defined as follows:

1. A fishing reel comprising: side walls;
   a spool shaft rotatably supported between the side walls;
   a spool supported on the spool shaft for holding fishing line;
   a handle shaft;
   a driving gear on the handle shaft including a drive pin;
   a pinion on the spool shaft for selectively engaging the driving gear for winding in the fishing line upon the spool;
   and a level wind, the level wind comprising a generally transverse shaft including a star wheel for receiving the drive pin rotatably secured between the side walls in front of the spool, the transverse shaft having a longitudinal axis and being adapted to be rotated about its axis by the driving gear, the transverse shaft being formed with a central portion that is at an oblique angle with respect to the axis of the transverse shaft, a member having an eyelet associated therewith through which the fishing line is threaded, the obliquely-oriented portion of the transverse shaft being rotatably captured by the eyelet-carrying member;
   whereby the member and eyelet oscillate back and forth in front of the spool upon rotation of the transverse shaft by the drive pin engaging the star wheel so that when fishing line is reeled in it is wound evenly along the length of the spool.

2. The fishing reel of claim 1 wherein the transverse shaft is relieved to form a slot at its central portion so that the obliquely-oriented portion is formed by two spaced-apart, generally parallel faces.

3. The fishing reel of claim 2, wherein the relieved portion of the transverse shaft between the two generally parallel faces is perpendicular to the faces.

4. The fishing reel of claim 2, wherein the shaft comprises an elongated spindle and two sleeves, the sleeves being slidably received on the shaft and each having an end that comprises one of the pair of parallel faces.

5. The fishing reel of claim 2, wherein the eyelet-carrying member comprises a plate, the portion of the plate capturing the relieved portion of the transverse shaft having a width sized to substantially fill the space between the parallel faces.

6. The fishing reel of claim 1 wherein the obliquely-oriented central portion of the transverse shaft comprises a disk having two spaced-apart faces.

7. The fishing reel of claim 1, wherein the transverse shaft is made of a single piece of material.

8. The fishing reel of claim 3, wherein the transverse shaft is in injection molded.

9. The fishing reel of claim 7, wherein the transverse shaft is die-cast.

10. The fishing reel of claim 1, wherein the angle between the longitudinal axis of the transverse shaft and the obliquely-oriented portion of the shaft is at least 40°.

11. The fishing reel of claim 1, wherein the eyelet-carrying member is supported forward of the shaft by a cross-member mounted between the side walls of the reel.

12. The fishing reel of claim 11, wherein the cross-member is captured in a spherical bearing and the eyelet-carrying member includes an elongated track in which the spherical bearing is captured for sliding and rotating motion.

13. A level wind for use with a fishing reel having two side walls, a spool supported upon a spool shaft between the two side walls, and a handle shaft having a driving gear including a drive pin associated therewith, the level wind comprising;
   a generally transverse shaft including a star wheel for receiving the drive pin and having a longitudinal axis adapted to be rotatably secured between the side walls in front of the spool, the transverse shaft being adapted to be rotated about its axis by the driving gear, and being formed with a central portion that is at an oblique angle with respect to the axis of the transverse shaft, and a member having an eyelet associated therewith through which the fishing line is threaded, the obliquely-oriented portion of the transverse shaft being rotatably captured by the eyelet-carrying member;
   whereby the member and eyelet oscillate back and forth in front of the spool upon rotation of the transverse shaft by the drive pin engaging the star wheel.

14. The level wind of claim 13, wherein the transverse shaft is relieved to form a slot at its central portion so that the obliquely-oriented portion is formed by two spaced-apart, generally parallel faces.

15. The level wind of the claim 14, wherein the relieved portion of the transverse shaft between the two generally parallel faces is perpendicular to the faces.

16. The level wind of claim 14, wherein the transverse shaft comprises an elongated spindle and two sleeves, each sleeve being received on the shaft and having an end that comprises one of the pair of parallel faces.

17. The level wind of claim 14, wherein the eyelet-carrying member comprises a plate, the portion of the member capturing the relieved portion of the transverse shaft having a width sized to substantially fill the space between the parallel faces.

18. The level wind of claim 13, wherein the obliquely-oriented central portion of the transverse shaft comprises a disk having two spaced-apart faces.

19. The level wind of claim 13, wherein the transverse shaft is made of a single piece of material.

20. The level wind of claim 19, wherein the transverse shaft is injected molded.

21. The level wind of claim 19, wherein the transverse shaft is die-cast.

22. The level wind of claim 13, wherein the angle between the longitudinal axis of the transverse the obliquely-oriented portion of the shaft is at least 40°.

23. The level wind of claim 13, wherein the eyelet-carrying member is adapted to be supported forward of the transverse shaft by a cross-member mounted between the side walls of the reel.

24. The level wind of claim 23, wherein the eyelet-carrying member comprises a spherical bearing and an elongated track in which the spherical bearing is captured for sliding and rotating motion, the spherical bearing being adapted to slidably receive the cross-member.

25. A fishing reel comprising:

side walls;

a spool shaft rotatably supported between the side walls;

a spool supported on the spool shaft for holding fishing line;

a handle shaft;

a driving gear on the handle shaft;

a pinion on the spool shaft for selectively engaging the driving gear for winding in the fishing line upon the spool;

and a level wind comprising a generally transverse shaft rotatably secured between the side walls in front of the spool, the transverse shaft being rotated by a Geneva motion mechanism comprising a pin rotated by the handle shaft and a star wheel for receiving the pin mounted on the transverse shaft.

26. A fishing reel comprising: side walls;

a spool shaft rotatably supported between the side walls;

a spool supported on the spool shaft for holding fishing line;

a handle shaft;

a driving gear o n the handle shaft;

a pinion on the spool shaft for selectively engaging the driving gear for winding in the fishing line upon the spool;

and a level wind, the level wind comprising a generally transverse shaft comprising an elongated spindle and two sleeves slidably received thereon and rotatably secured between the side walls in front of the spool, the transverse shaft having a longitudinal axis and being adapted to be rotated about its axis by the driving gear, the transverse shaft being formed with a central portion having two spaced-apart, generally parallel faces on the sleeve that are at an oblique angle with respect to the axis of the transverse shaft, a member having an eyelet associated therewith through which the fishing line is threaded, the obliquely-oriented portion of the transverse shaft being rotatably captured by the eyelet-carrying member;

whereby the member and eyelet oscillate back and forth in front of the spool upon rotation of the transverse shaft by the driving gear so that when fishing line is reeled in it is wound evenly along the length of the spool.

27. A fishing reel comprising: side walls;

a spool shaft rotatably supported between the side walls;

a spool supported on the spool shaft for holding fishing line;

a cross member mounted between the side walls forward of the spool;

a handle shaft;

a driving gear on the handle shaft;

a pinion on the spool shaft for selectively engaging the driving gear for winding in the fishing line upon the spool;

and a level wind, the level wind comprising a generally transverse shaft rotatably secured between the side walls in front of the spool, the transverse shaft having a longitudinal axis and being adapted to be rotated about its axis by the driving gear, the transverse shaft being formed with a central portion that is at an oblique angle with respect to the axis of the transverse shaft, a member having an eyelet associated therewith through which the fishing line is threaded, the eyelet carrying member including an elongated track with a spherical bearing captured therein, the spherical bearing capturing the cross-member, and the obliquely-oriented portion of the transverse shaft being rotatably captured by the eyelet-carrying member;

whereby the member and eyelet oscillate back and forth in front of the spool upon rotation of the transverse shaft by the driving gear so that when fishing line is reeled in it is wound evenly along the length of the spool.

* * * * *